(12) United States Patent
Gitelson et al.

(10) Patent No.: US 7,275,251 B2
(45) Date of Patent: Sep. 25, 2007

(54) SELECTIVE PROCESS RESTART BASED ON API CHANGES

(75) Inventors: Gary Gitelson, San Jose, CA (US); Michael Boe, San Francisco, CA (US); Prasannakumar Murugesan, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/430,944

(22) Filed: May 7, 2003

(65) Prior Publication Data

US 2004/0226028 A1 Nov. 11, 2004

(51) Int. Cl.
*G06F 9/46* (2006.01)

(52) U.S. Cl. .................. 719/328; 719/331; 718/102

(58) Field of Classification Search ............... 719/328, 719/310, 331; 717/168, 169, 170, 162, 176, 717/120; 709/223; 714/6; 707/203; 713/1; 718/102

See application file for complete search history.

(56) References Cited

U.S. PATENT DOCUMENTS

| | | | | |
|---|---|---|---|---|
| 5,873,097 A * | 2/1999 | Harris et al. | ................ | 707/203 |
| 6,044,461 A * | 3/2000 | Agha et al. | ..................... | 713/1 |
| 6,256,773 B1 | 7/2001 | Bowman-Amuah | ............ | 717/1 |
| 6,332,198 B1 * | 12/2001 | Simons et al. | ................. | 714/6 |
| 6,370,573 B1 | 4/2002 | Bowman-Amuah | ......... | 709/223 |
| 6,470,388 B1 | 10/2002 | Niemi et al. | ................ | 709/224 |
| 6,519,571 B1 | 2/2003 | Guheen et al. | ............... | 705/14 |
| 6,539,396 B1 | 3/2003 | Bowman-Amuah | ......... | 707/103 |
| 6,550,057 B1 | 4/2003 | Bowman-Amuah | ......... | 717/126 |
| 6,601,186 B1 * | 7/2003 | Fox et al. | ....................... | 714/4 |
| 6,604,136 B1 * | 8/2003 | Chang et al. | ............... | 709/223 |
| 6,651,186 B1 * | 11/2003 | Schwabe | .................... | 714/38 |
| 6,671,699 B1 * | 12/2003 | Black et al. | ............... | 707/201 |
| 6,678,887 B1 * | 1/2004 | Hallman et al. | ............ | 717/162 |
| 6,694,450 B1 * | 2/2004 | Kidder et al. | ................. | 714/15 |
| 6,708,210 B2 * | 3/2004 | Chang et al. | ............... | 709/223 |
| 6,934,749 B1 * | 8/2005 | Black et al. | ................ | 709/224 |
| 6,957,237 B1 * | 10/2005 | Traversat et al. | .......... | 707/206 |
| 7,020,696 B1 * | 3/2006 | Perry et al. | ................. | 709/223 |
| 2003/0149801 A1* | 8/2003 | Kushnirskiy | ............... | 709/328 |
| 2004/0010791 A1* | 1/2004 | Jain et al. | ................... | 719/318 |

* cited by examiner

*Primary Examiner*—Van H. Nguyen
(74) *Attorney, Agent, or Firm*—Cindy Kaplan (57) ABSTRACT

Techniques for selectively restarting processes based on API changes are provided. Information is stored that can be accessed to identify processes that are affected by an API change. The stored information can be modified to reflect the API change and the processes that are affected can be restarted. Thus, processes that are not affected by the API change need not be restarted.

21 Claims, 9 Drawing Sheets

| PROCESS | CONTAINER |
|---|---|
| PROCESS A | CONTAINER M |
| PROCESS A | CONTAINER N |
| PROCESS A | CONTAINER O |
| PROCESS B | CONTAINER N |
| • | |
| • | |
| • | |

| PROCESS | API |
|---|---|
| PROCESS A | API X |
| PROCESS A | API Y |
| PROCESS A | API Z |
| • | • |
| • | • |
| • | • |

| API | CONTAINER |
|---|---|
| API X | CONTAINER M |
| API X | CONTAINER N |
| API Y | CONTAINER M |
| • | • |
| • | • |
| • | • |

| ENTRY | PROCESS | CONTAINER | API | NEXT |
|---|---|---|---|---|
| 1 | A | M | X | -1 |
| 2 | A | M | Y | -1 |
| 3 | A | N | Z | -1 |
| ⋮ | ⋮ | ⋮ | ⋮ | ⋮ |

*FIG. 6A*

| ENTRY | PROCESS | CONTAINER | API | NEXT |
|---|---|---|---|---|
| 1 | A | M | X | 17 |
| 2 | A | M | Y | -1 |
| 3 | A | N | Z | -1 |
| ⋮ | ⋮ | ⋮ | ⋮ | ⋮ |
| 17 | A | O | X | -1 |

*FIG. 6B*

| ENTRY | PROCESS | CONTAINER | API | NEXT |
|-------|---------|-----------|-----|------|
| 1 | A | M | X | 17 |
| 2 | A | M | Y | -1 |
| 3 | A | N | Z | -1 |
| • | • | • | • | • |
| • | • | • | • | • |
| • | • | • | • | • |
| 17 | A | O | X | 25 |
| • | • | • | • | • |
| • | • | • | • | • |
| • | • | • | • | • |
| 25 | A | P | X | -1 |

SELECTIVE PROCESS RESTART BASED ON API CHANGES

BACKGROUND OF THE INVENTION

The present invention relates to selective process restart based on application programming interface (API) changes. More specifically, the invention relates to storing process-to-API and process-to-container dependencies in order to determine the processes, and only those processes, that are affected by API changes.

In most software systems, a collection of software modules will provide an implementation of a service. This service will be accessed by the application through the use of an API. The API itself has a set of symbols (functions and data elements) that comprise the software state and the modifiers of that software state. A given implementation of a service, provided by a specific set of modules, and accessed through the specified API will be referred to as an API service implementation. Typically, both the API and the API service implementation will have versions (e.g., numbers or anything to uniquely identify the version) associated with them. The API has a version, which tracks modification to the definition of the API, such as which symbols are a part of it and what the signature of those symbols is. For data elements, the signature of the symbol is the data type description. For functions, the signature contains the data type descriptions of the return value and all of the parameter values of the function.

The API service implementation also has a version associated with it. This is the version assigned to the collection of modules and tracks the revisions of the modules in the implementation of the defined API.

A specific API service implementation will implement a particular version of the API. At the time that an application is started, it may require the use of an API service implementation that implements the specific version of the API that it makes use of.

There may be multiple versions of an API service implementation present on a system and the system should choose the appropriate version that will be loaded in the address space of the application when it is started. These versions come about as bugs are fixed or new functions are added to an API and new revisions of the software modules that comprise the API service implementation are released to customers.

In a software system where multiple versions of a particular API service implementation can exist simultaneously, one could restart all the processes so that any process that might be impacted by a change in an API service implementation would be restarted. However, it would be beneficial to have innovative technologies that allow a determination of the processes that are affected by changes in an API service implementation so that only those processes are restarted. Additionally, it would be beneficial to be able to determine when there are no processes that could ever utilize an API service implementation so the unused API service implementation can be deleted.

SUMMARY OF THE INVENTION

The present invention provides innovative techniques for the selective restart of processes based on API changes. In general, information is stored when processes begin executing that indicates the APIs that the processes are using and the code containers or software modules that are providing the API implementation. By storing this information, the processes that are executing can be analyzed when an API change occurs to determine those processes that are impacted by the change. The processes that are impacted can then be restarted to take advantage of the change in the API, whether it is a new implementation or the deletion of a previous implementation. Advantages of embodiments of the invention can include restarting only those processes that are affected by API changes and the removal of API implementations that will not be used by any of the processes. Some specific embodiments of the invention are described below.

In one embodiment, the invention provides a method for selectively restarting processes based on API changes. A new container is received that includes a new implementation of an API. Stored information is accessed to identify one or more processes that utilize an old implementation of the API. The one or more processes are restarted so that they can utilize the new implementation of the API in the new container. Additionally, the stored information can be modified to indicate the one or more processes utilized the new implementation of the API in the new container.

In another embodiment, the invention provides a method for selectively restarting processes based on API changes. A message is received that a specified container should no longer be utilized, where the container includes an implementation of an API. Stored information is accessed to identify one or more processes that utilize the implementation of the API in the specified container. The one or more processes are restarted so that the one or more processes can utilize a previous implementation of the API in an other container.

In another embodiment, the invention provides a method for selectively restarting processes based on a API changes. Executables are dynamically linked to run processes, where the processes utilize APIs from one or more containers. Process-to-API dependencies and process-to-container dependencies are stored. Upon receiving an API change, only those processes affected by the API change are restarted. Additionally, chronologies of APIs can be stored and the chronologies can include an API and a container that provided the API.

Other features and advantages of the invention will become readily apparent upon review of the following description in association with the accompanying drawings, where the same or similar structures are designated with the same reference numerals.

DETAILED DESCRIPTION OF PREFERRED EMBODIMENTS

In the description that follows, the present invention will be described in reference to embodiments in network devices that perform selective process restart based on API changes. These network devices (e.g., routers) are typically embedded systems. However, embodiments of the invention are not limited to any particular environment, protocol, application or implementation. For example, the invention may be advantageously applied to non-embedded systems, such as computer systems. Therefore, the description of the embodiments that follows is for purposes of illustration and not limitation.

Figure 1:
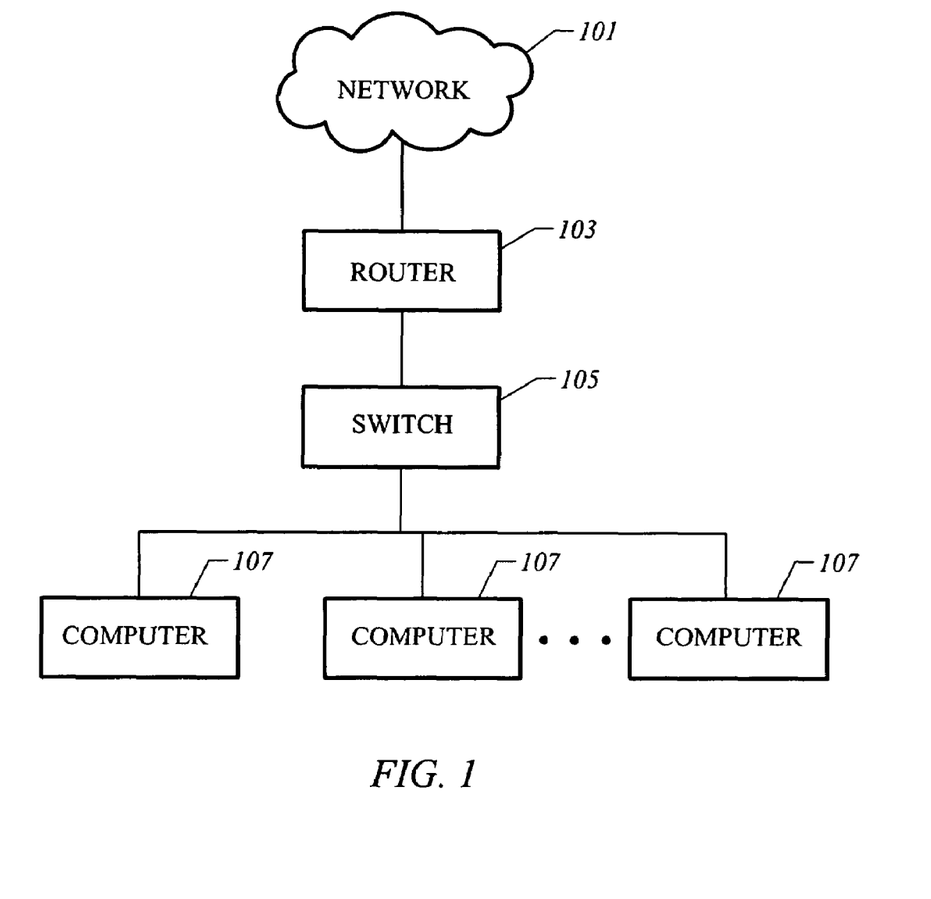
FIG. 1 shows an example of a network and network components.

FIG. 1 shows a block diagram of a network environment. A network 101 is shown in communication with a router 103. Network 101 can be a local area network (LAN) or wide area network (WAN), such as the Internet. Although shown as a cloud, network 101 typically includes multiple network devices and computer systems, some of which are shown in FIG. 1.

Router 103 provides communication between networks. A switch 105 is connected to router 103 and joins communication lines from computers 107.

Although a router and switch are shown in FIG. 1, these are meant to illustrate examples of network devices that can exist in a network. There are many other network devices that can be found in networks and the functionality of multiple network devices can also be combined into a single network device. Therefore, the invention is not limited to any specific network device or configuration.

Figure 2:
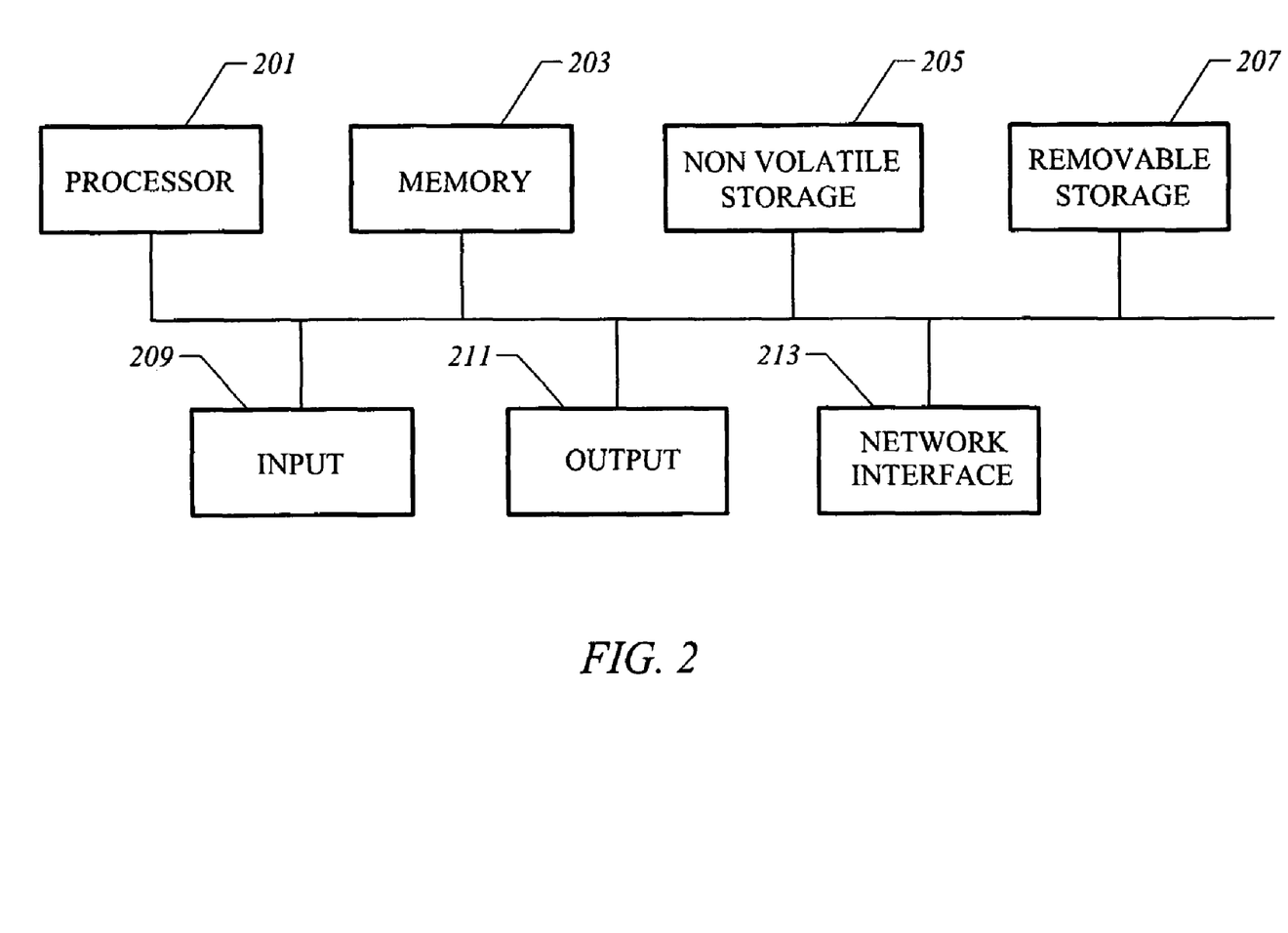
FIG. 2 illustrates a block diagram of a computer system or network device that can utilize embodiments of the invention.

FIG. 2 shows a block diagram of components that can be present in network devices and computer systems that implement embodiments of the invention. A processor 201 executes instructions from computer programs (including operating systems). Although processors typically have memory caches, processor 201 utilizes memory 203, which can store instructions or computer code and data.

A non-volatile storage 205 can store computer programs and data such that it is typically persistent and provides more storage when compared to memory 203. At present, a common non-volatile storage is one or more hard drives. A removable storage 207 provides mobility to computer programs and/or data that are stored thereon. Examples of removable storage are floppy disks, tape, CD/ROM, flash memory devices, and the like.

Memory 203, non-volatile storage 205 and removable storage 207 provide examples of computer readable storage media that can be utilized to store and retrieve computer programs incorporating computer codes that implement the invention, data for use with the invention, and the like. Additionally, a data signal embodied in a carrier wave (e.g., in a network including the Internet) can be the computer readable storage medium. An input 209 allows a user to interface with the system. Input can be done through the use of a keyboard, a mouse, buttons, dials, or any other input mechanism. An output 211 allows the system to provide output to the user. Output can be provided through a monitor, display screen, LEDs, printer or any other output mechanism.

A network interface 213 allows the system to interface with a network to which it is connected. The components shown in FIG. 2 can be found in many network devices and computer systems. However, components can be added, deleted and combined so FIG. 2 is for illustration purposes.

Figure 3:
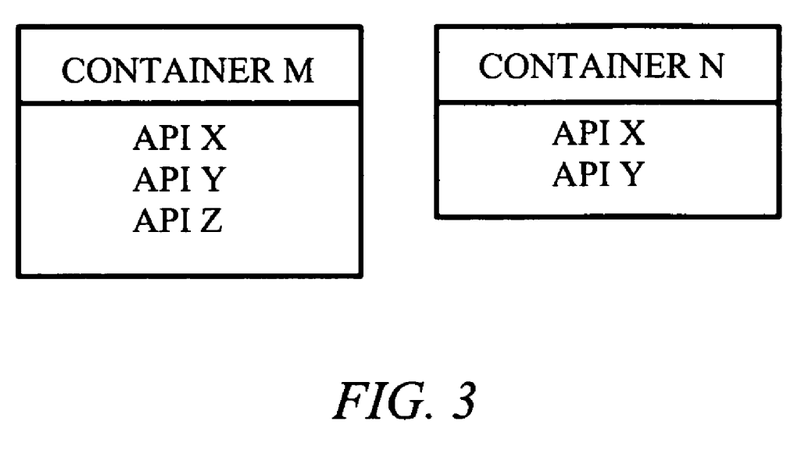
FIG. 3 shows an example of two containers and the APIs that they provide.

The above has described exemplary network and hardware configurations, it may be beneficial now to discuss API implementations and how they are typically delivered. FIG. 3 shows two containers that include API implementations. A container (or software module) M is shown to include implementations for API X, API Y and API Z. Similarly, container N provides implementations for API X and API Y. Although containers typically include implementations for numerous APIs, these simple containers will be utilized to illustrate how API changes can affect processes.

An executable is a file that when executed by the system operates as a running process. More than one process can be running on a system that is from the same executable file. For the most part, a process is defined by the executable. However, there are functions and/or data that are part of a process yet are not specifically defined by the executable (e.g., API implementations and linked libraries).

For example, an executable can be designed to interface with functions and/or data from an API. Upon execution, the executable is typically dynamically linked to a container that provides the API implementation.

Getting back to FIG. 3, assume a process utilizes API X from container M. Subsequently, new implementations for API X and API Y are provided by container N. As API X has changed (e.g., the implementation), a process that relies on API X or API Y should be restarted so that the processes can utilize the new implementations. Restarting a process typically includes the dynamic linking and execution of an executable file.

However, if a process only utilized API Z from container M, it would not be necessary to restart the process because of container N. Thus, when an API change occurs, only selective processes may need to be restarted.

As shown, a process can depend on an API implementation. However, any computer code can depend on an API implementation. Thus, one API implementation can depend on another. For simplicity, FIG. 3 shows a flat hierarchy of API implementations. In some embodiments, API implementations depend on other API implementations creating a tree hierarchy of dependencies. An API change in any API implementation in the tree can affect a dependent process so that process may need to be restarted.

One could restart all the processes that are currently executing whenever an API change occurs. However, this could result in many processes being restarted where the API change did not affect the process. As an alternative, a skilled engineer could analyze each process to determine whether the API change would affect the process. As one can imagine, this process would be time consuming and potentially error prone.

An API change can also be the removal or deletion of an API implementation. For example, a system could be informed that container N should no longer be utilized. Processes that utilize API implementations from container N should then be restarted. However, processes that do not utilize API implementations from container N could remain unchanged. With embodiments of the invention, information is stored that allows processes to be selectively restarted based on API changes. Thus, only those processes that are affected by an API change can be restarted while the processes that are unaffected can continue to run.

Figure 4:
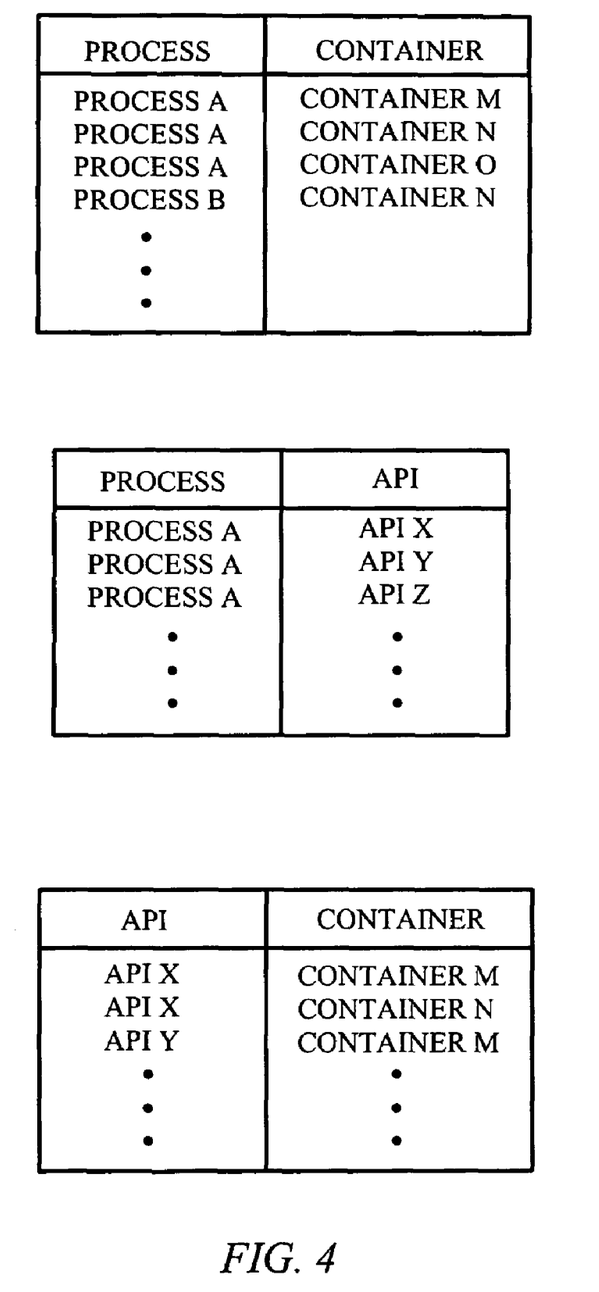
FIG. 4 shows an example of tables that can be utilized to store information regarding the containers and APIs shown in FIG. 3 for multiple processes.

In one embodiment, the stored information includes process-to-container dependencies, process API dependencies and chronologies of APIs. FIG. 4 shows tables that can be utilized to store this information. Dependency calculations can be done either statically or dynamically. For example, the dependency calculations can be done statically on a separate device or dynamically on the running device.

As shown a process-to-container table stores tuples that indicate a specified process is relying on an API implementation from the specified container. For example, the tuple (process A, container M) indicates that process A relies on an API implementation from container M. A process can rely on API implementations from multiple containers and the table can store information for multiple processes. In embodiments where all processes from the same executable file are identical, the same entries in the tables can be utilized for all identical processes for simplicity and/or to save storage space.

Also shown in FIG. 4 is a process-to-API table. The tuples in this table indicate the API implementations that each process utilizes. For example, the tuple (process A, API X) indicates that process A utilizes API X.

An API to container table as shown can be utilized to store chronologies of APIs. For example, the tuple (API X, container M) indicates that container M provides an implementation for API X. The subsequent tuple (API X, container N) indicates that container N provides a new implementation of API X. Although tables are shown, any other data structure including link lists can be utilized to store this information.

When an executable is dynamically linked and executed to run a process, symbols will be resolved and the resolution of the symbols can be stored in the table such as the ones shown in FIG. 4. These tables can be stored in shared memory and the stored information can be accessed whenever API changes occur (e.g., a new container is received). Additionally, the stored information can be updated to reflect the API changes. Accordingly, this stored information allows processes to be selectively restarted based on API changes.

Figure 5:
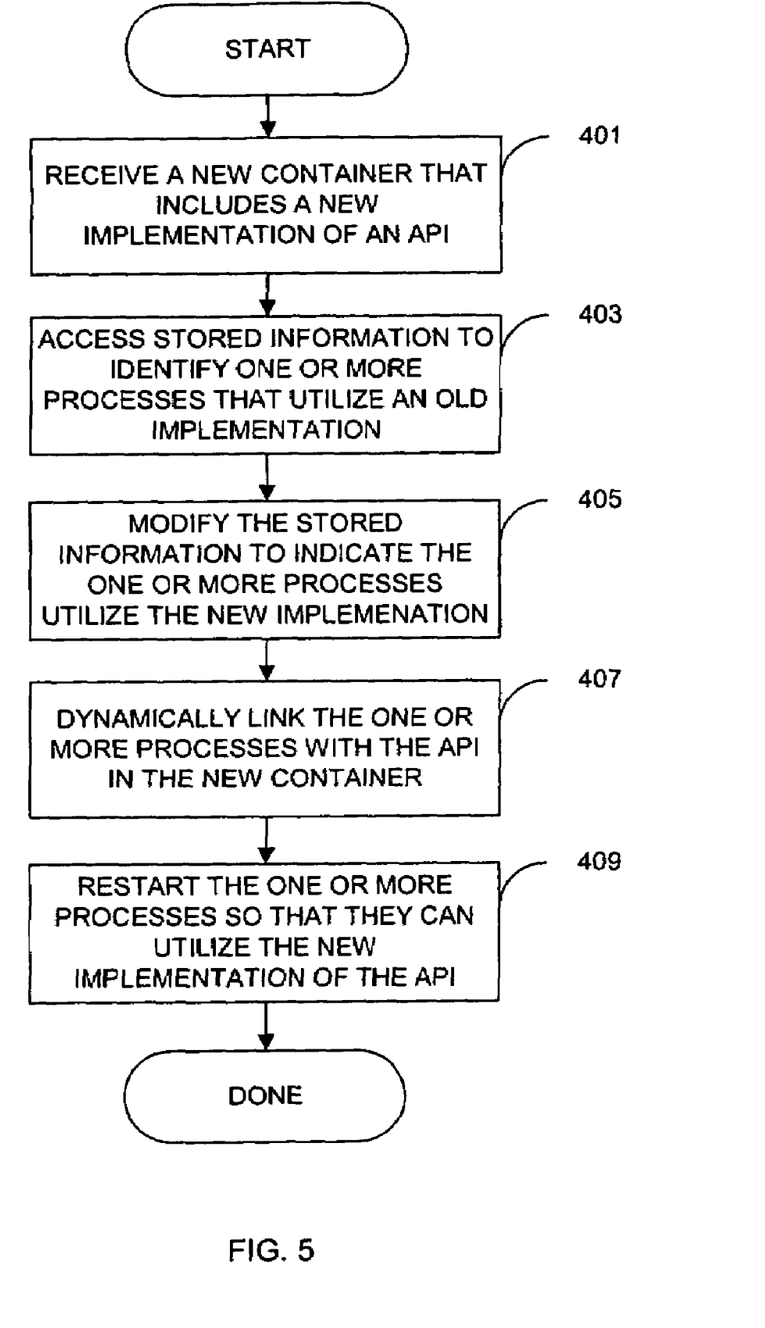
FIG. 5 shows a flowchart of a process for selectively restarting processes based on API changes.

FIG. 5 shows a flowchart of a process for selectively restarting processes based on API changes. At a step 401, a new container that includes a new implementation of an API is received. As an example, the new container could be received on removable storage or accessed through a network. Stored information is accessed at a step 403 to identify one or more processes that utilize an old implementation of the API. For example, if the new container included a new implementation of API X shown in FIG. 4, access to the process-to-API table would show that process A has been affected by the API change.

At a step 405, the stored information is modified to indicate the one or more processes that utilize the new implementation of the API in the new container. For example, if the new container provided a new implementation of API X, this could result in a new tuple being added to the process-to-container table shown in FIG. 4. Additionally, a tuple may be deleted from the process-to-container shown in FIG. 4 if one or more containers no longer utilize a container.

When a new API implementation is received, the API to container table can be updated to reflect the chronology of the API implementation. For example, a tuple can be added to the API to container to indicate that the new container provides a new implementation of the API.

The one or more processes that can utilize the new implementation of the API in the container are dynamically linked at a step 407. At a step 409, the one or more processes are restarted so that the one or more processes can utilize the new implementation of the API. Therefore, only those processes that are affected by an API change are restarted. Typically, a new container will include multiple new API implementations that may be processed together or individually. It should be noted that with all the flowcharts shown herein, steps can be added, deleted, reordered and combined without departing from the spirit and scope of the invention.

Figure 6A:
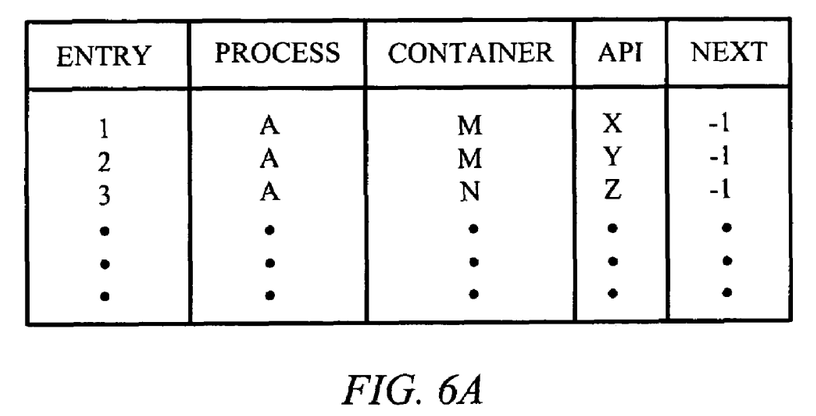
FIGS. 6A-6C show an example over time of a table that maintains process-to-API and process-to-container dependencies.
Figure 6B:
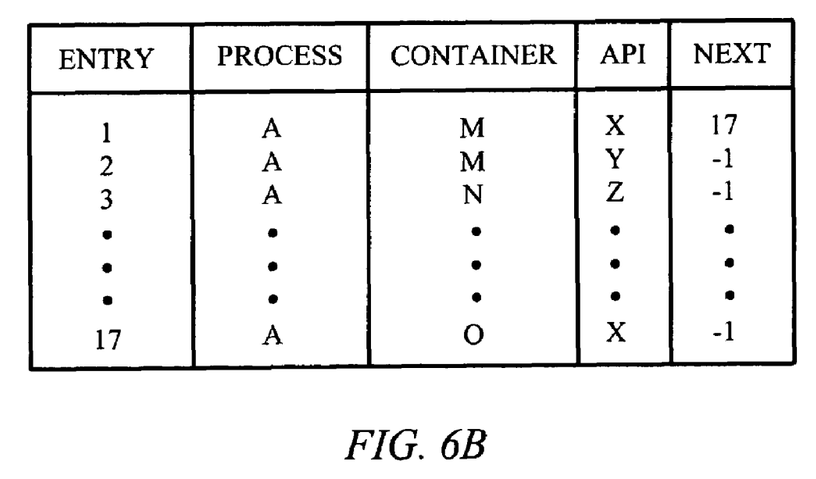
Figure 6C:
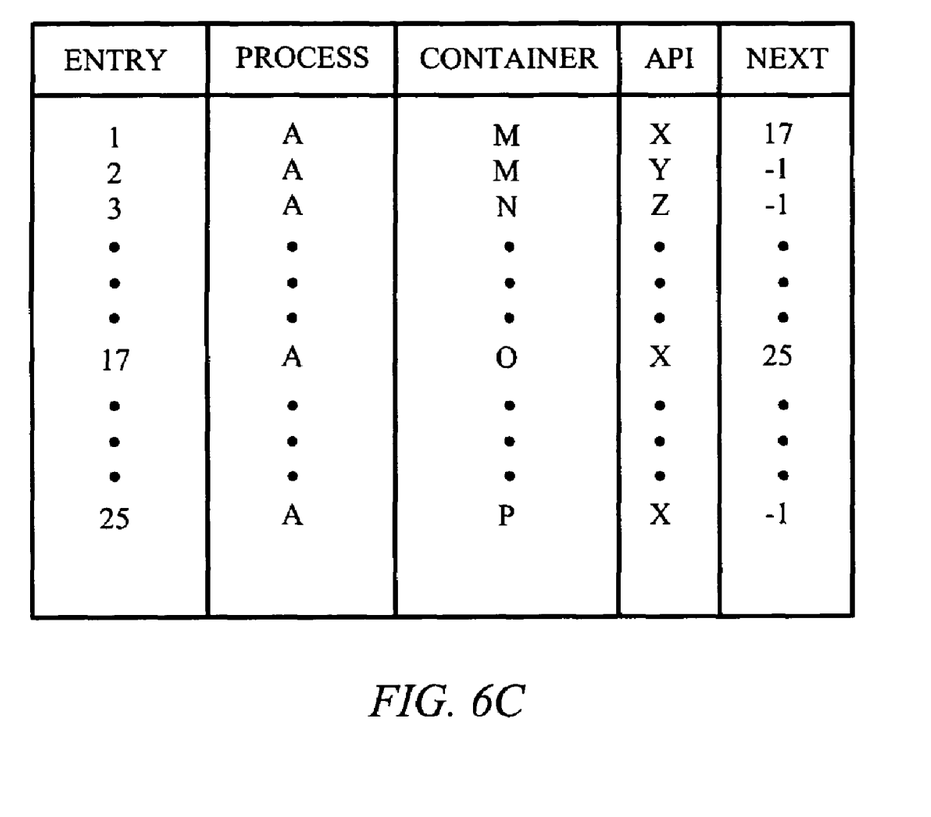

As mentioned above, numerous data structures can be utilized to store the information that allows selective restarting of processes based on API changes. FIGS. 6A-6C show examples of a single table that can be utilized to store much, if not all, of the information in the tables shown in FIG. 4.

FIG. 6A shows a table that includes a number of fields. The entry field uniquely identifies each row in the table. Although this field can be utilized and it may aid in describing the invention, the entry field may not be necessary if one utilizes offsets to rows in the table. Therefore, the invention is not limited to the specific fields shown in FIG. 6A.

A process field stores identifiers for processes. As shown, the process field can include the name of the process. In other embodiments, a separate table can be utilized to associate a unique identifier (e.g., a number) to each process. In a similar manner, the container field identifies containers and the API field identifies APIs. As shown, a tuple (process A, container M, API X) indicates that process A utilizes container M for API X. The next field is utilized to chain rows of the table together in order to store dependencies of APIs. This field will be discussed in more detail in reference to FIG. 6B.

FIG. 6B shows the table in FIG. 6A at a later point in time. As indicated above, the next field is utilized to chain rows of the table together. A "−1" is utilized as the end of a chain of rows or to indicate that no chain of rows exist off of this row. As can be seen, rows 2-3 do not have any rows that chain from these rows.

As mentioned above, process A utilizes container M for API X. If a new container, container O, provides a new implementation for API X, a new entry in the table can be added in FIG. 6B. The row identified by entry 17 has been added and it shows that process A now utilizes container O for API X. Additionally, the next field of the row identified by entry one is updated to store 17. The next field therefore chains the row identified by entry to the row identified by entry 17 to indicate that the new row provides a newer implementation of an API. The next field of the row indicated by entry 17 is shown to store a −1 to indicate that this is the last row of the chain.

In a similar manner, FIG. 6C shows a subsequent table that has been updated to indicate that a new container, container P, has been received that provides a new implementation for API X, which is utilized by process A. As shown, the row identified by entry one chains to the row entry 17 which in turn chains to the row identified by entry 25. If a message is received that a container should no longer be utilized, a chain that has the container as the last entry can be shortened to removed the last row in the chain.

The above has described how a single table can be utilized to store the process-to-container dependencies, process-to-API dependencies and chronologies of APIs. In affect, the three tables shown in FIG. 4 have been combined into a single table. Nevertheless, in some embodiments, a process-to-container table may still be maintained for dynamically linking and loading processes.

The table shown in FIGS. 6A-6C is a table that also includes linked lists of chronologies of APIs. Although these data structures have been combined in some embodiments, other embodiments can utilize separate data structures.

Figure 7:
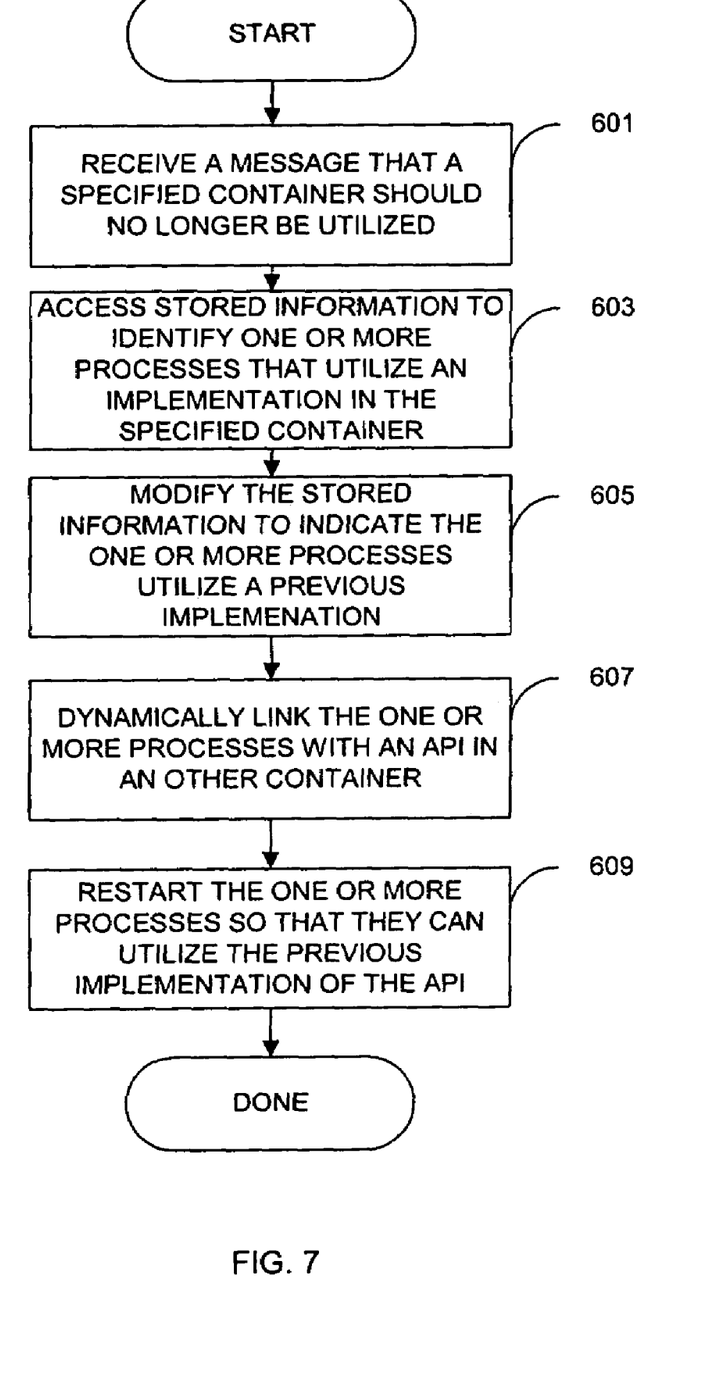
FIG. 7 shows a flowchart of another process for selectively restarting processes based on API changes.

The above has described processes that can be implemented when a new container with a new implementation of an API is received. FIG. 7 shows a flowchart of a process for selectively restarting processes based on API changes where the API change is that a specified container should no longer be utilized.

At a step 601, a message is received that a specified container should no longer be utilized where the container includes an implementation of an API. In some instances, it may be desirable to roll back a process to no longer utilize API implementations from a container. For example, if it is determined that a container is not compatible with other existing containers, it may be beneficial to essentially uninstall the problematic container.

Stored information is accessed at a step 603 to identify one or more processes that utilize the implementation of the API in the specified container. Typically, a container will include implementations for multiple APIs.

At a step 605, the stored information is modified to indicate the one or more processes utilize a previous implementation of the API in an other container. In other words, the system identifies another or previous container that provides an implementation of the API. For example, a previous entry in a linked list of API dependencies indicate a container to utilize (see, e.g., FIG. 6C). The stored information can be updated to indicate the new chronology of the API. As mentioned above, this could also affect process-to-container dependencies, depending upon the containers and the APIs that they implement.

The one or more processes are dynamically linked with the API in the other container at a step 607. At a step 609, the one or more processes are restarted so that the one or more processes can utilize the previous implementation of the API in the other container.

The above has discussed how processes can be selectively restarted based on API changes, it may be beneficial to describe how the stored information can be initially generated. In one embodiment, the executable files indicate the APIs that are required. Additionally, the containers indicate the APIs that they provide and the APIs that are needed. By utilizing this information, one can readily determine the containers that should be dynamically linked with the executable to provide the specified APIs for the process.

Figure 8:
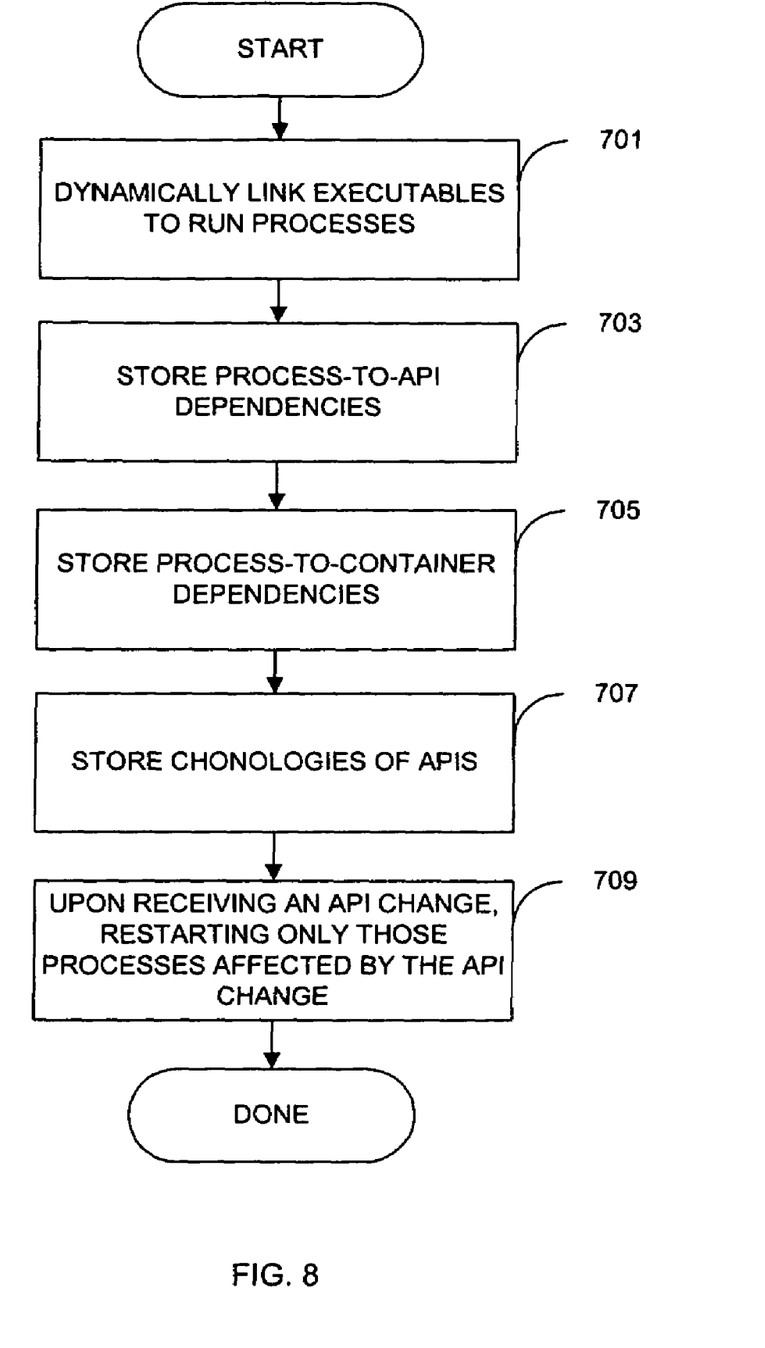
FIG. 8 shows a flowchart of another process for selectively restarting processes based on API changes.

FIG. 8 shows a flowchart of a process for selectively restarting processes based on API changes by storing information. At a step 701, executables are dynamically linked to run processes where the processes utilize APIs from one or more containers. Process-to-API dependencies are stored at a step 703. At a step 705, process-to-container dependencies are stored.

At a step 707, chronologies of APIs are stored. Typically, the chronologies include an API and a container that provided the API. Steps 703, 705 and 707 can generate the tables shown in FIG. 4, FIGS. 6A-6C or any other data structures.

Upon receiving an API change, only those processes affected by the API change are restarted at a step 709. The API change can be a new API implementation of deletion of an API implementation.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention as defined by the meets and bounds of the appended claims along with their full scope of equivalents.

What is claimed is:

1. A method for selectively restarting processes based on API changes, comprising:
   receiving at a network device a new container that includes a new implementation of an API;
   accessing stored information in memory of the network device, to identify one or more processes that utilize an old implementation of the API;
   updating said stored information to indicate the one or more processes that utilize the new implementation of the API in the new container;
   dynamically linking the one or more processes with the API in the new container; and
   selectively restarting the one or more processes utilizing a processor of the network device so that the one or more processes can utilize the new implementation of the API in the new container, without restarting processes unaffected by the new API implementation;
   wherein said old implementation of the API and identification of said one or more processes that utilized said old implementation of the API are maintained in said memory.

2. The method of claim 1, further comprising modifying the stored information to indicate the one or more processes utilize the new implementation of the API in the new container.

3. The method of claim 1, wherein the identification of said one or more processes that utilized said old implementation of the API include an API and a container that provided the old implementation of the API.

4. The method of claim 1, wherein the stored information includes process-to-API dependencies.

5. The method of claim 1, wherein the stored information includes process-to-container dependencies.

6. The method of claim 1, wherein the stored information includes chronologies of APIs.

7. The method of claim 6, wherein the chronologies include an API and a container that provided the API.

8. The method of claim 1, wherein the stored information includes process-to-container dependencies.

9. The method of claim 1 further comprising selectively restarting the one or more processes so that the one or more processes can utilize said old implementation of the API.

10. An apparatus that selectively restarts processes based on API changes, comprising:
    a processor that receives a new container that includes a new implementation of an API; accesses stored information to identify one or more processes that utilize an old implementation of the API; updates said stored information to indicate the one or more processes that utilize the new implementation of the API in the new container; dynamically links the one or more processes with the API in the new container; and selectively restarts the one or more processes so that the one or more processes can utilize the new implementation of the API in the new container, without restarting processes unaffected by the new API implementation; and
    a memory that stores data for the processor;
    wherein said old implementation of the API and identification of said one or more processes that utilized said old implementation of the API are maintained in said memory.

11. The apparatus of claim 10 wherein the processor is operable to restart the one or more processes so that the one or more processes can utilize said old implementation of the API.

12. A computer program product that selectively restarts processes based on API changes, comprising:
- computer code that receives a new container that includes a new implementation of an API;
- computer code that accesses stored information to identify one or more processes that utilize an old implementation of the API;
- computer code that updates said stored information to indicate the one or more processes that utilize the new implementation of the API in the new container;
- computer code that dynamically links the one or more processes with the API in the new container;
- computer code that selectively restarts the one or more processes so that the one or more processes can utilize the new implementation of the API in the new container without restarting processes unaffected by the new API implementation; and
- a computer-readable medium that stores the computer codes;
- wherein the computer-readable storage medium is not a data signal embodied in a carrier wave; and
- wherein said old implementation of the API and identification of said one or more processes that utilized said old implementation of the API are maintained in said computer-readable medium.

13. The computer program product of claim 12, wherein the stored information includes process-to-API dependencies.

14. The computer program product of claim 12, wherein the stored information includes process-to-container dependencies.

15. The computer program product of claim 12, wherein the stored information includes chronologies of APIs.

16. The computer program product of claim 15, wherein the chronologies include an API and a container that provided the API.

17. An apparatus for that selectively restarts processes based on API changes, comprising:
- a memory;
- means for receiving a new container that includes a new implementation of an API;
- means for accessing stored information to identify one or more processes that utilize an old implementation of the API;
- means for updating said stored information to indicate the one or more processes that utilize the new implementation of the API in the new container;
- means for dynamically linking the one or more processes with the API in the new container;
- means for selectively restarting the one or more processes so that the one or more processes can utilize the new implementation of the API in the new container, without restarting processes unaffected by the new API implementation;
- wherein said old implementation of the API and identification of said one or more processes that utilized said old implementation of the API are maintained in said memory.

18. The apparatus of claim 17, wherein the stored information includes process-to-API dependencies.

19. The apparatus of claim 17, wherein the stored information includes process-to-container dependencies.

20. The apparatus of claim 17, wherein the stored information includes chronologies of APIs.

21. The apparatus of claim 20, wherein the chronologies include an API and a container that provided the API.

* * * * *